FERROMAGNETIC MULTIFILM MEMORY ELEMENTS

Filed Feb. 14, 1968 6 Sheets-Sheet 1

Inventors:
Henri Gerard Feissel
and
Francois Charles Gallet
BY Baldwin Wight Diller x Brown
Attorneys

FERROMAGNETIC MULTIFILM MEMORY ELEMENTS

Filed Feb. 14, 1968 6 Sheets-Sheet 2

Inventors:
Henri Gerard Feissel
and
Francois Charles Gallet
BY Baldwin Wight Diller & Brown
Attorneys Inventors:
Henri Gerard Feissel
and
Francois Charles Gallet
BY Baldwin Wight Diller & Brown
Attorneys

FERROMAGNETIC MULTIFILM MEMORY ELEMENTS

Filed Feb. 14, 1968 6 Sheets-Sheet 4

Inventors:
Henri Gerard Feissel
and
Francois Charles Gallet
BY Baldwin Wight Diller & Brown
Attorneys May 12, 1970 H. G. FEISSEL ET AL 3,512,143

FERROMAGNETIC MULTIFILM MEMORY ELEMENTS

Filed Feb. 14, 1968 6 Sheets-Sheet 5

Inventors:
Henri Gerard Feissel
and
Francois Charles Gallet
BY Baldwin Wight Diller & Brown
Attorneys

FERROMAGNETIC MULTIFILM MEMORY ELEMENTS

Inventors:
Henri Gerard Feissel
and
Francois Charles Gallet
BY Baldwin Wight Diller & Brown
Attorneys

United States Patent Office 3,512,143
Patented May 12, 1970

3,512,143
FERROMAGNETIC MULTIFILM MEMORY ELEMENTS

Henri Gerard Feissel, Paris, and Francois Charles Gallet, Orsay, France, assignors to Societe Industrielle Bull-General Electric (Societe Anonyme), Paris, France Filed Feb. 14, 1968, Ser. No. 705,532
Claims priority, application France, Mar. 8, 1967, 97,980
Int. Cl. G11c 7/02, 11/14; H01f 10/06
U.S. Cl. 340—174 8 Claims

ABSTRACT OF THE DISCLOSURE

As component of a rapid matrix memory, a data storage element comprises an anisotropic magnetic film disposed at the crossing point of a first conductor and a second conductor, and two closing bridges of isotropic magnetic material applied to the same face of the said film in order each to close, respectively, a magnetic circuit around one of the said conductors, the first and second closing bridges being arranged to permit a certain mutual magnetic coupling to reduce the overall dimensions of the element or to improve the operation thereof.

Figure 1:
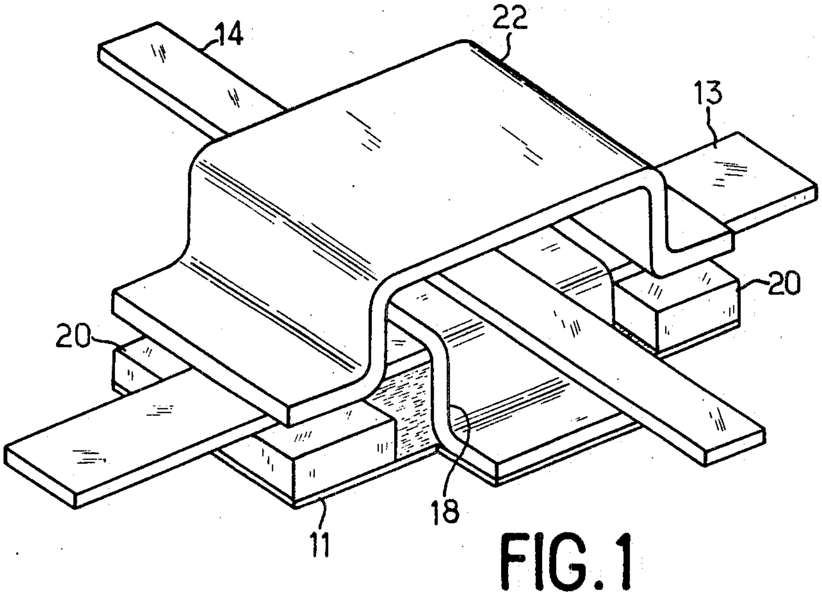

This invention relates to matrix memories and concerns more particularly improvements in ferromagnetic film storage elements employed to form a rapid memory of high capacity and of reduced dimensions.

This type of memory is now well known and it will be recalled that in general a memory plane is formed by the association of two sets of orthogonal excitation conductors and of a number of flat magnetic film elements disposed at the crossing points of these conductors on an appropriate support. It is also known that the conductors of one set are conventionally called "word" conductors and those of the other set "digit" conductors.

Generally, each memory element is formed of an isotropic magnetic film having two stable states of magnetisation and consituting an "open" magnetic circuit, that is to say, its flux path is closed in air. The fact that the magnetic circuit is open gives rise to a number of disadvantages. The memory element is very sensitive to distrubing fields and this effect imposes severe limitations in the choice of the dimensions. These limitations prevent the positioning of a large number of these elements in a given unit of surface. In other words, it is difficult to reach a high information storage density per square centimetre.

In addition, for a given total flux, the strengths of the control currents necessary in the two directions are relatively high. Finally, the fact that each element creates around itself a parasitic field whose action is exerted on the neighbouring elements is contrary to the obtainment of a high storage density.

In order to reduce the extent of these unfavourable effects, it has been proposed to provide a thin film element with a member for closing a magnetic circuit containing one of the main axes of magnetisation. This improvement, which is also obtained by using discrete or non-discrete tubular thin films, however, is not sufficient to attain all the objects aimed at.

According to a first U.S. patent application No. 684,323 filed by the applicants on Nov. 20, 1967, it has been proposed to provide each elemental memory film with two pairs of pole pieces, each pair being intended to facilitate the closing of the magnetic flux in one of the main magnetising directions. Since the thickness of these pole pieces is greater than that of the film, the lines of force are deflected from the plane of the film, but the improvement thus obtained is only partial, even in cases where a sheet of material having relatively low permeability, known as a "keeper," is disposed in proximity thereto.

In addition, there has been proposed a memory element comprising a ferromagnetic film associated with two magnetic-circuit closing members each disposed on an opposite face of the film and each surrounding one of the control conductors. Although this construction is very effective and has the advantage of very low overall dimensions, it nevertheless has a number of disadvantages. In order that the anisotropic film may have all the required magnetic properties and the desirable uniformity, it is much preferable for this film to be deposited in the first place on a completely uniform and appropriately prepared support. In order that a control conductor and a flux-closing member may subsequently be disposed on either side of the anisotropic film, it is essential for the latter to be transferred at a given instant onto a material support different from that onto which it was initially deposited. This necessitates a relatively complex and therefore costly process of manufacture.

On the other hand, in accordance with a second U.S. patent application No. 690,853, filed by the applicants on Dec. 15, 1967, there has been proposed a memory element comprising an anisotropic ferromagnetic film completed by two flux-closing members each surrounding one of the control conductors and adapted to be positioned on the same side of the anisotropic film, but the contours of which do not overlap. This type of element may afford advantageous characteristics as compared with the conventional elements, but the fact that the projections onto the plane of the anisotropic film of the two closing members must not have common parts involves the disadvantage that the surface occupied by such an element is relatively large.

The invention has for its object to provide a flat-film memory element which has distinctly improved characteristics owing to the substantially complete closure of two magnetic circuits each including one of the main axes of magnetisation.

The invention also has for its object to provide a memory element thus improved and no longer having the disadvantages referred to in the foregoing, while lending itself to a somewhat simplified manufacture of collective type in accordance with the techniques of depositing thin films which are at present known.

Accordingly, the invention provides, for a matrix memory in which a storage cell is located at the crossing of two conductors belonging respectively to a first set and to a second set of orthogonal conductors, a memory element comprising a flat anisotropic ferromagnetic film disposed at the crossing point of two of these conductors, two closing bridges of ferromagnetic material disposed on the same side as the conductors in relation to a particular face of the anisotropic film, each closing bridge being arranged to close a magnetic circuit comprising negligible or zero air gaps around one of the said conductors, so that the respective fluxes substantially cross one another at a right-angle in the anisotropic film, but that, outside the latter, the two magnetic circuits are not completely independent, either by reason of their mutual couplings or by reason of their constructional structure, and means for supporting these elements and electrically insulating them.

In a first embodiment, the two closing bridges are physically separate and are constructed in the form of magnetic layers which overlap at least partially, and which are separated only by one or more insulating and optionally conductive layers.

In a second embodiment, the two closing bridges comprises a common portion separate from the anisotropic film.

By virtue of these features, the two closing bridges can no longer be regarded as independent. There may exist between them couplings which must be taken into account in the choice of dimensions in each embodiment. These couplings may have the effect either of creating, around one of the control conductors, parasitic magnetic circuits whose flux does not pass through the anisotropic film and which consequently unnecessarily increase the characteristic inductance of the control conductor under consideration or of creating distortions in the control magnetic fields to which the anisotropic film is subjected. These distortions may contribute to reducing the flux usefully stored by the memory element and may make it necessary to increase one of the control currents in order to obtain satisfactory operation.

Figure 3:
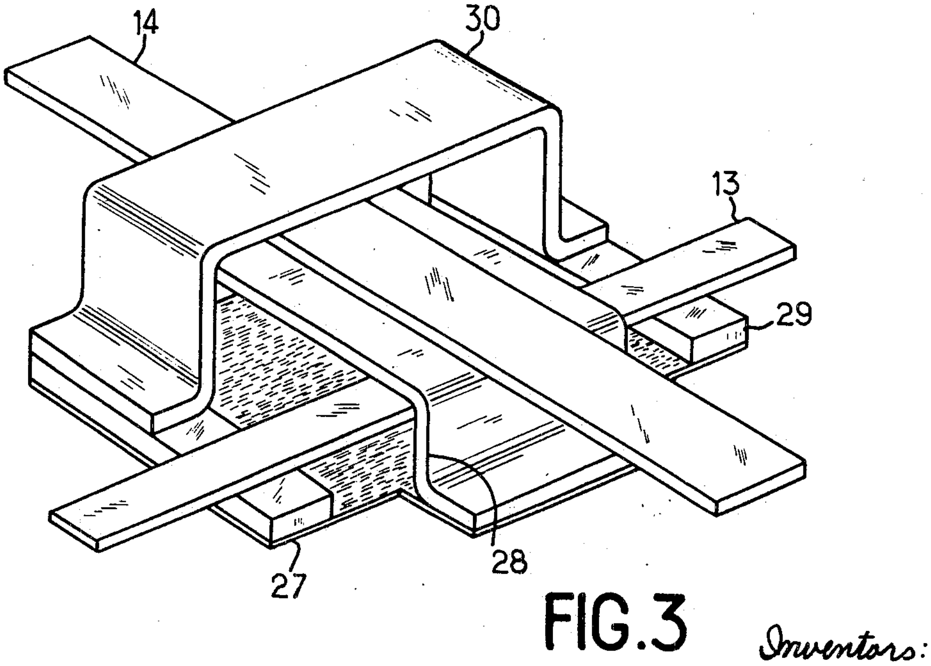

For a better understanding of the invention and to show how it may be carried into effect, embodiments thereof will now be described by way of example, with reference to the accompanying drawings, in which:

FIGS. 1 and 3 are perspective views showing the approximate structure of two of the embodiments according to the invention, FIGS. 1A, 2A, 3A and 4A are plan views of memory elements each comprising two materially independent closing bridges, FIGS. 1B, 2B, 3B and 4B are sectional views each taken along the line X—X of the corresponding FIGS. 1A 2A, 3A and 4A.

Figure 1D:
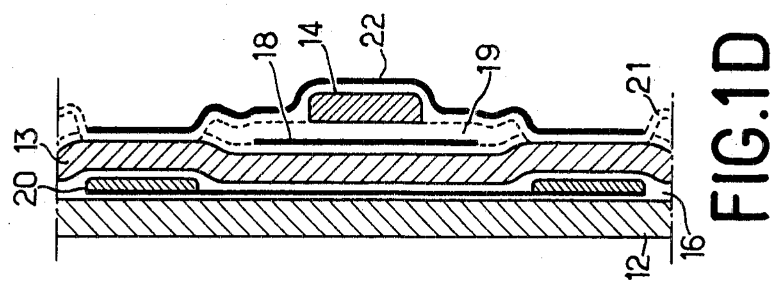
Figure 1C:
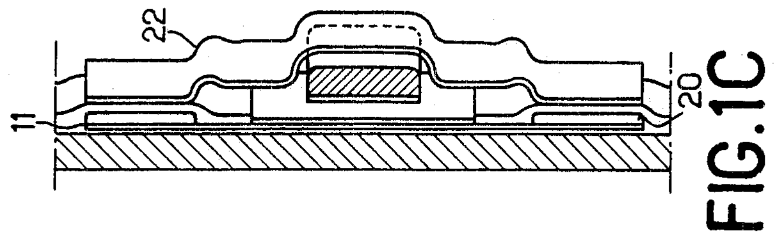
Figures 2A, 2B, 2C, 2D:
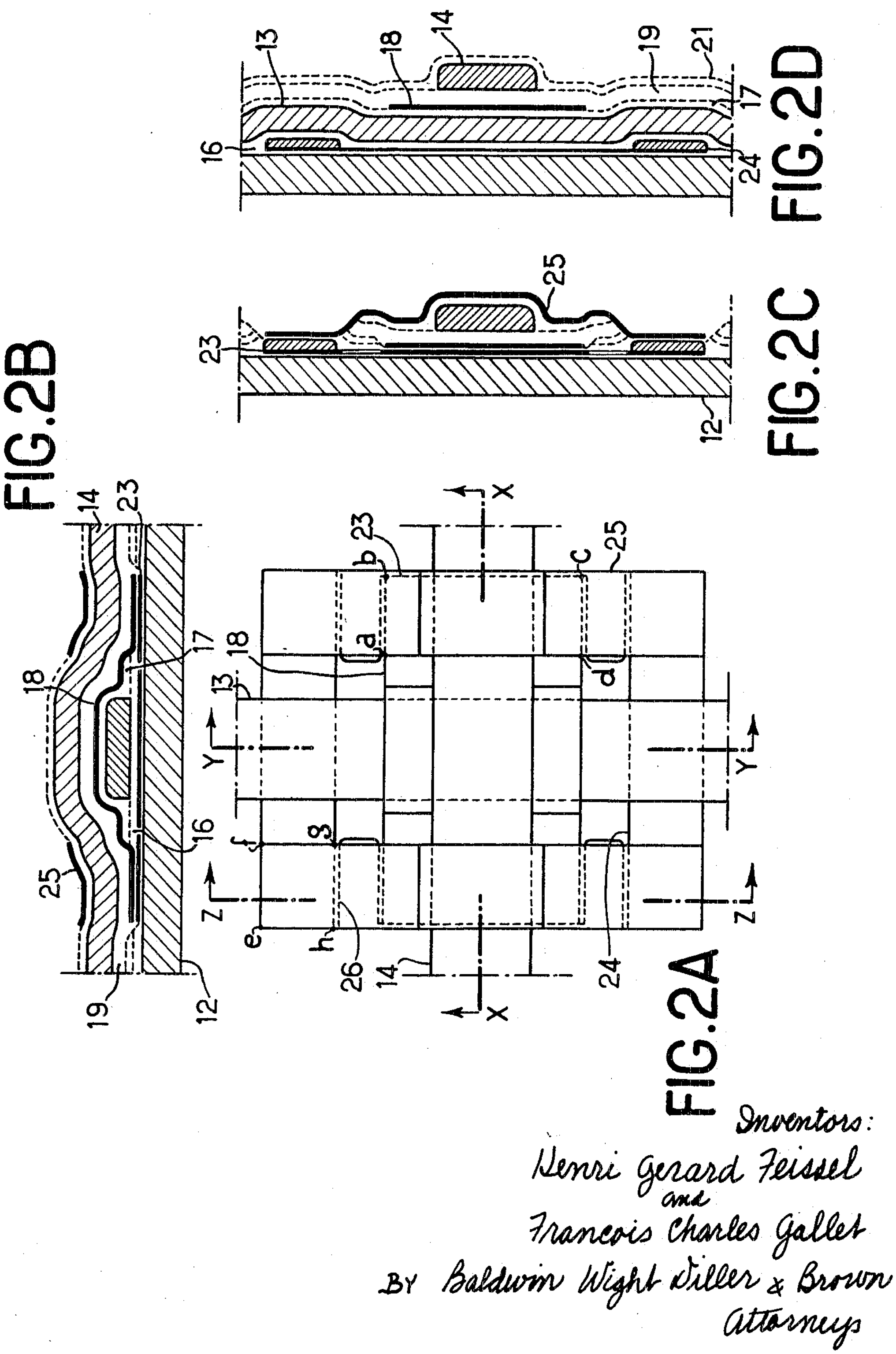
Figure 3D:
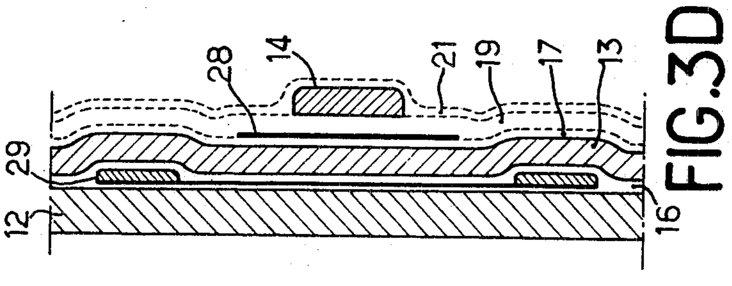
Figure 3C:
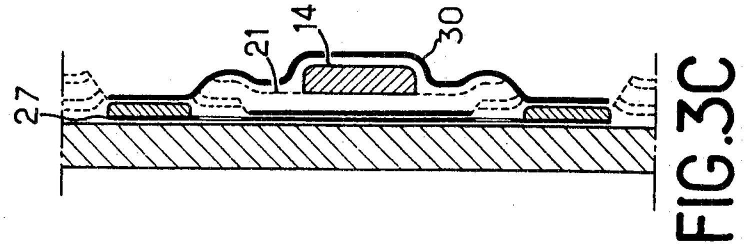
Figure 3B:
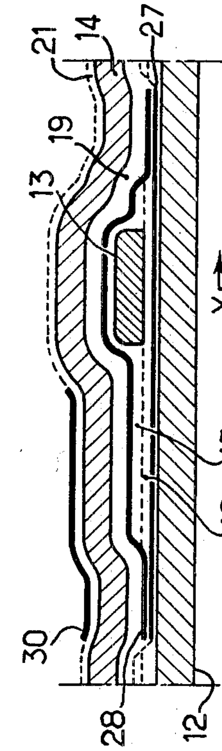
Figure 3A:
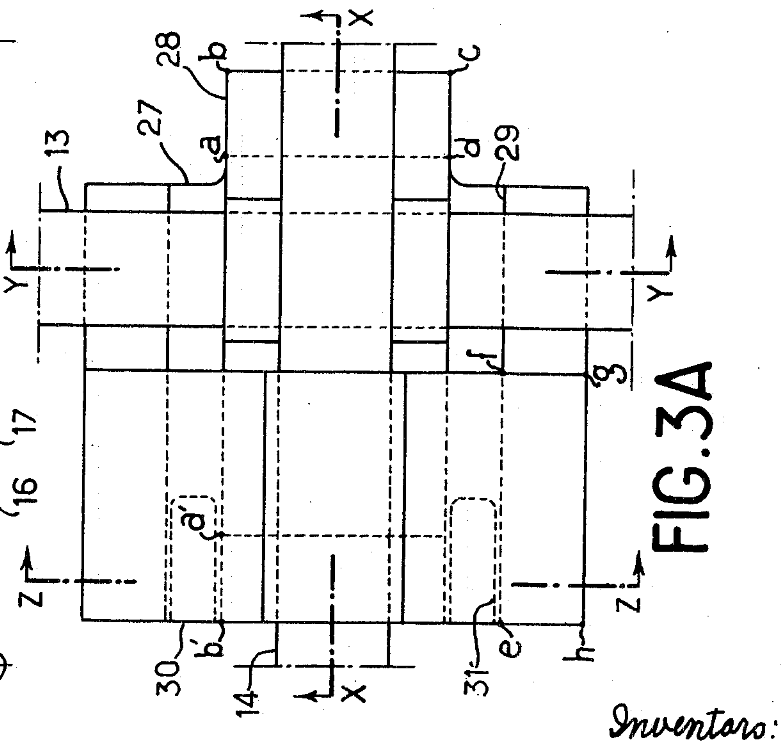
Figures 4A, 4B, 4C, 4D:
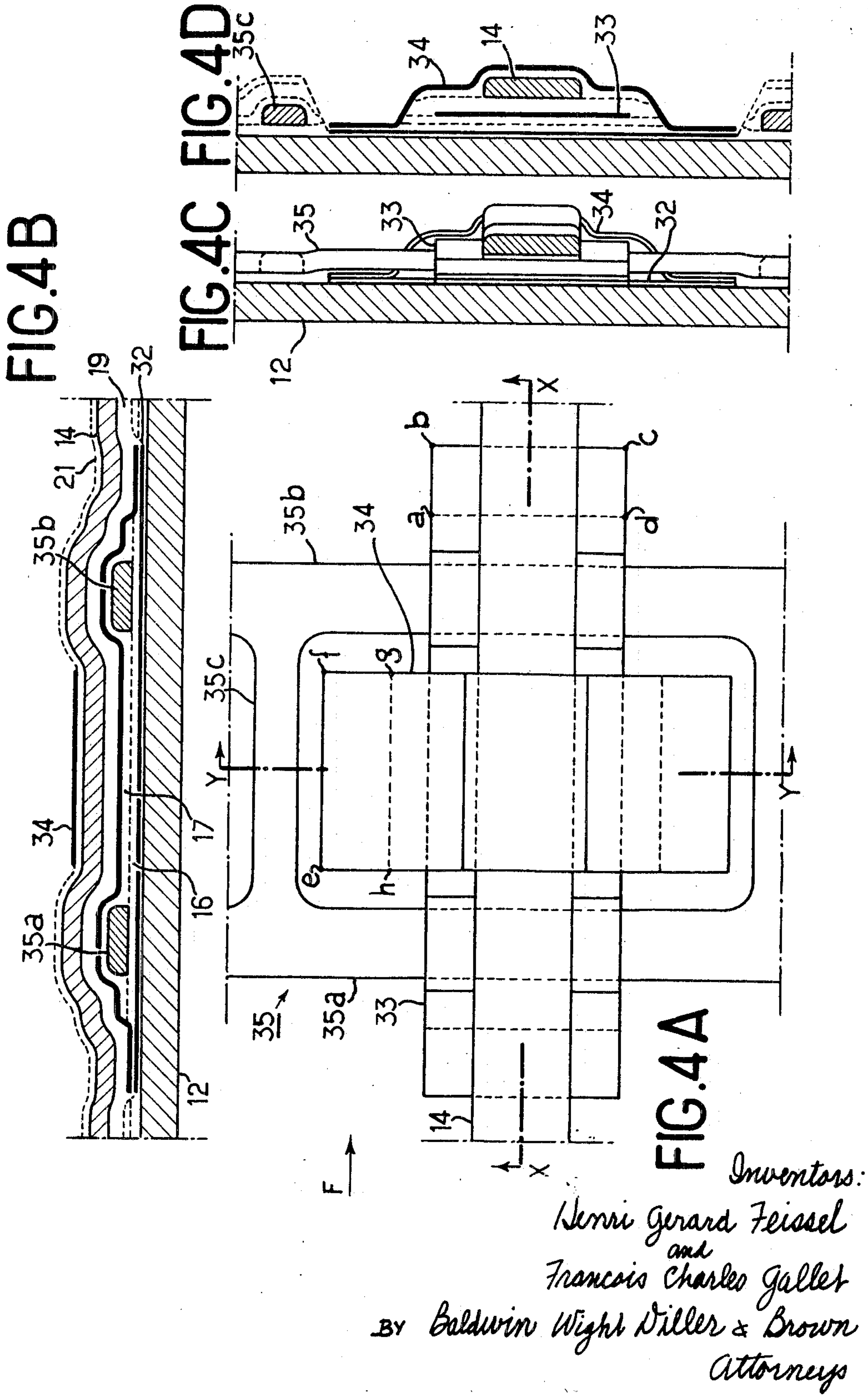
Figures 5A, 5B, 5C:
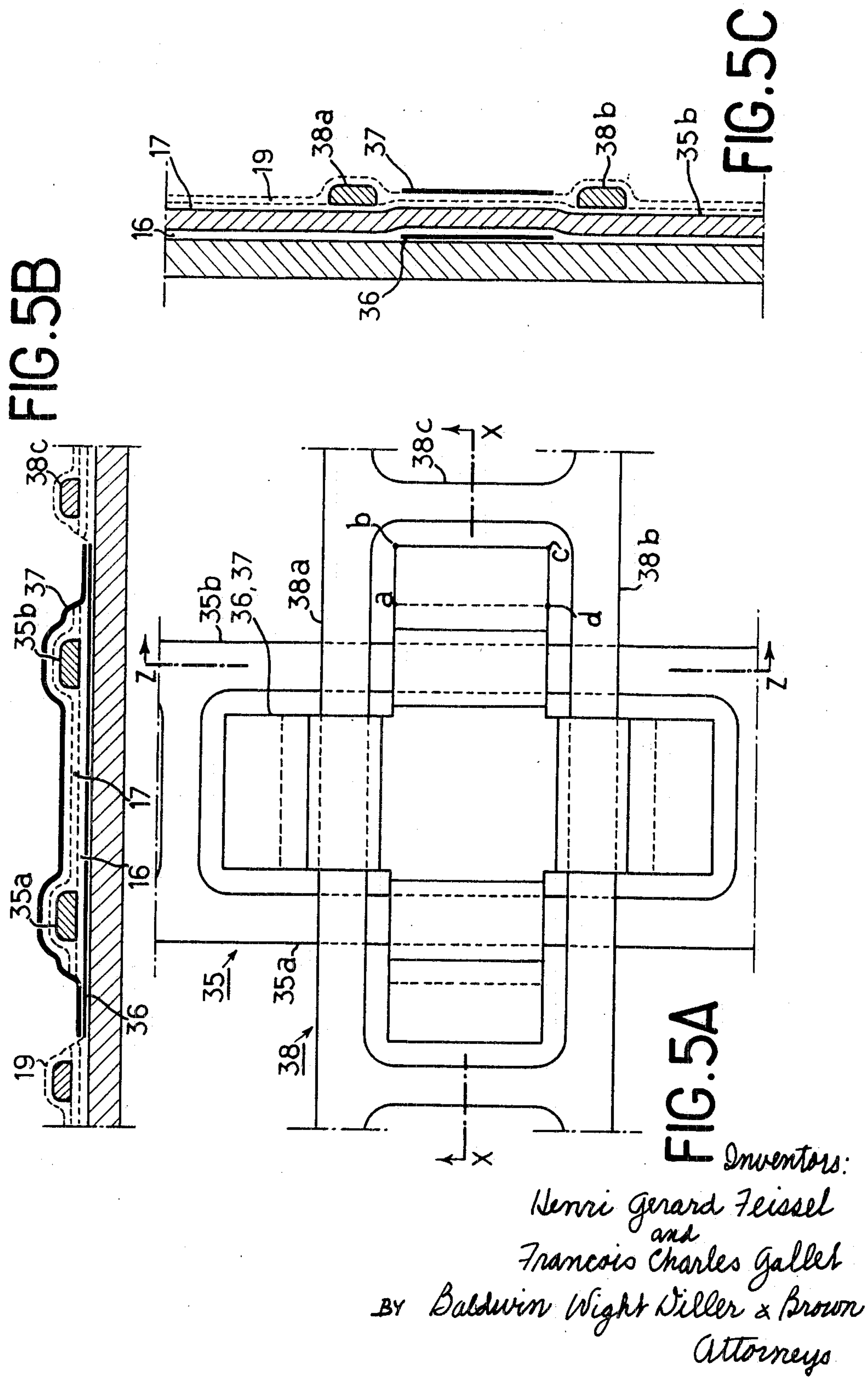

FIGS. 1C and 4C are side views as seen in the direction of the arrow F in the corresponding FIGS. 1A and 4A, FIGS. 2C and 3C are sectional views taken along the line Z—Z of the corresponding FIGS. 2A and 3A, FIGS. 1D, 2D, 3D and 4D are section views taken along the line Y—Y of the corresponding FIGS. 1A, 2A, 3A and 4A, FIG. 5A is a plan view of a memory element having a singe common closing bridge, and FIGS. 5B and 5C are sections taken along the lines X—X and Z—Z of FIG. 5A.

Generally speaking, in the sectional views, a memory element is illustrated in each instance in such manner that the thickness of the component parts, both conductive and magnetic, appear as greatly exaggerated as compared with the other dimensions, such as the width and length of these component parts. Moreover, in order to preserve the clarity of the drawings, some of the views, and more particularly the plan views, are drawn as if the insulating layers were not present or were transparent. However, the limits of the latter are indicated by chain lines in the corresponding sectional views.

Embodiments will first be considered in which the two closing bridges are materially independent and partially superimposed and must therefore be prepared one after the other.

Figure 1B:
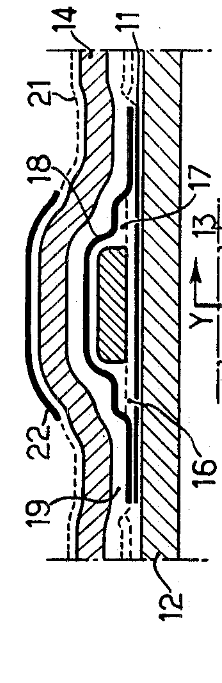
Figure 1A:
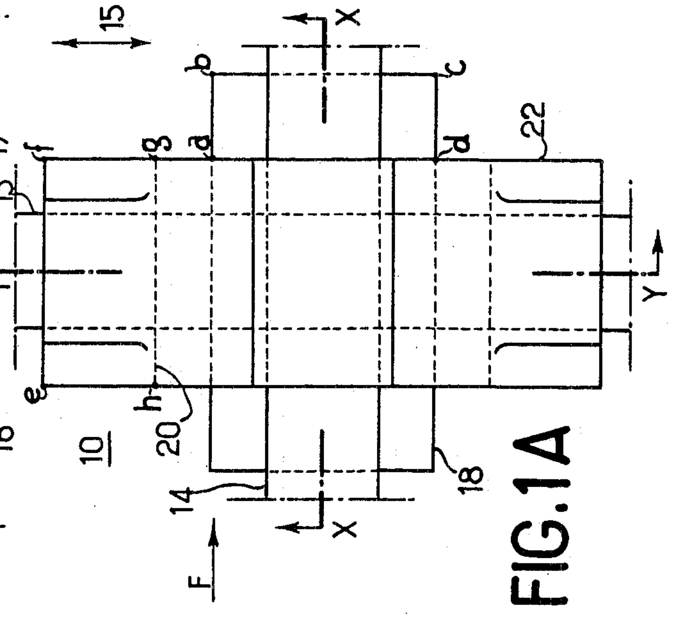

In the embodiment illustrated in FIGS. 1 and 1A to 1D, FIG. 1 is a diagrammatic view in perspective of the memory element 10, which is shown in plan view in FIG. 1A. FIGS. 1B and 1D illustrate sectional views taken along the lines X—X and Y—Y respectively, and FIG. 1C is a side view as seen in the direction of the arrow F, as indicated in FIG. 1A. The memory element 10, which is symmetrical about the axes X—X and Y—Y, is constructed essentially around the ferromagnetic film 11. Generally speaking, the latter is rendered anisotropic in its initial preparation, for example under the action of an appropriate magnetic field. It is deposited upon the support 12, which is designed for the construction of a memory plane. This support consists of a sheet of a non-magnetic material, for example of copper, the upper face of which gives, after surface grinding, a completely plane and smooth surface, and is covered by a very thin gold layer.

Situated above it is the "word" conductor 13, only one portion of which is shown, and above this again the "digit" conductor 14. It may be considered that the axis of easy magnetisation of the film is oriented in the manner of the word conductor 13, i.e. in the direction indicated by the arrow 15. The word conductor 13 is insulated from the film 11 by a first insulating layer 16. A second insulating layer 17 insulates the conductor 13 from the first closing bridge 18, the projected form of which is rectangular. These insulating layers are interrupted in two surfaces such as that defined by the points *a, b, c, d* (FIG. 1A), so that each of the ends of the closing bridge 18 is in contact with the upper face of the film 11. A third insulating layer 19 separates the closing bridge 18 from the digit conductor 14, which passes over the axis of difficult magnetisation of the film 11.

There are provided two rectangular portions of increased thickness or pole pieces 20, each of which extends over a surface such as that defined by the points *e, f, g, h* at the ends of the film 11. It may be assumed that these two pole pieces, which consist of ferromagnetic material, are in contact with the upper face of the film 11, since they are deposited upon the aforesaid surfaces at a time when no insulating layer is present.

A fourth insulating layer 21 separates the conductor 14 from the second closing bridge 22, the ends of which are situated opposite to the pole pieces 20. FIGS. 1C and 1D show that the ends of the second closing bridge 22 are not in contact with the pole pieces. Owing to the resultant air gap, the magnetic circuit surrounding the digit conductor 14 is not entirely closed. On the other hand, the existence of this air gap on the sides of the conductor 13 contributes to a reduction of any stray flux which might be set up around the said conductor between the pole pieces 20 and the bridge 22. However, in order to reduce the thickness of the residual air gap, the said first, second and third insulating layers 16, 17 and 19 may be interrupted above the pole pieces 20, a portion of the layer 16 then naturally remaining below the conductor 13. It is only after this that the fourth layer 21 is deposited, whereafter the second closing bridge 22 is formed.

It is to be noted that the first closing bridge serves advantageously as a metallic screen which reduces the capacitive coupling of the two control conductors at their crossing point. The anisotropic film 11 consists of a nickel-iron alloy of the "Permalloy" type. Its thickness may advantageously be 1000 to 5000 angstroms. The closing bridges 18 and 22 consisting of a material of like composition may have a thickness of the same order as that of the film 11, or even an appreciably larger thickness. It is only in order to facilitate the reading of the drawings that the pole pieces 20 have been shown as being thicker than the closing bridges, because they may in fact be made with the same thickness as the latter. The width *e–h* of the pole pieces 20 may be greater than the width *a–b* in order to compensate to some extent for the presence of the aforesaid residual air gap. The word or digit conductors may consist of a deposit of a metal which is a good conductor, such as copper, aluminium, silver, etc. Their minimum thickness may be a few microns. The insulating layers may be made of silicon monoxide in the case of deposition by evaporation in vacuo, or in the case of other methods of deposition they may consist of various organic varnishes or of a photo-sensitive resin, called a "photo-resist." Their minimum thickness may be of the order of 1 to 2 microns.

It will be seen from FIGS. 1B and 1D that the third insulating layer 19 has been formed with a greater thickness than the other insulating layers. This feature has the object of spacing the conductor 14 away from the closing bridge 18 in order to reduce somewhat the stray magnetic coupling between these two elements. Another method would be to use a digit conductor 14 of a slightly greater width than the first closing bridge 18, the third insulating layer being of normal thickness.

Although the combination of a plurality of such memory elements in a memory plane may be effected by various methods, its structure and the miniaturisation of these elements may necessitate the application of methods of production of the collective type involving a succession of depositions and/or engraving of thin layers, each operation being applied to all the elements which have to be provided on a common support.

The basic techniques may vary widely, i.e. they may consist of evaporation in vacuo, either of continuous layers or of layers deposited through masks, chemical deposition, electrolytic deposition, photogravure, etc. These various methods may also be employed in combination.

As a general example, the case may be envisaged in which the production of a memory plane involves above all chemical and electrolytic methods of deposition followed by photogravure, at least in regard to the magnetic components. After the electrolytic deposition upon the support 12 of a nickel-iron layer in the presence of a magnetic field of appropriate orientation, to form the anisotropic films 11, the latter are subjected to photogravure. This operation leaves a photo-resist layer on the unengraved parts.

This layer is eliminated and replaced by a fresh continuous photo-sensitive insulating layer, which is selectively dissolved in the interior of the contours of the pole pieces 20. An isotropic nickel-iron layer is then selectively electrolytically deposited in the zones in which the insulating layer has been eliminated. After complete elimination of this photo-resist layer, the deposition of the conductors 13 may take place in the following manner: deposition of the first insulating layer 16 which is to remain; chemical deposition of a continuous copper layer and then thickening of this layer by electrolytic means, photogravure of the copper layer leaving in position the conductors 13, and deposition of a further insulating layer 17; after exposure through an appropriate plate, selective dissolution of the insulating layers 16 and 17 in the surfaces such as *a b c d* which must subsequently effect the contact with the closing bridges 18.

In order thereafter to deposit the first closing bridges 18, metal (for example copper) may first be deposited by evaporation in vacuo through a mask which defines the contours thereof. The existence of this conductive layer thereafter makes it possible to effect a selective electrolytic deposition of isotropic iron-nickel. This method has the disadvantage that it leaves in the magnetic circuit a residual air gap consisting of the layer deposited in vacuo. This disadvantage may be obviated in various ways.

A first method consists in replacing copper by a ferromagnetic metal such as nickel. There will then be no air gap, but only a discontinuity in the nature of the magnetic material of the first bridge.

Another method consists in causing the conductive layer deposited in vacuo to project only very slightly on the two sides of the insulating layer 17, because, as the surfaces such as *a b c d* have previously been freed from all insulation, it is sufficient for the layer deposited in vacuo to provide a continuous conductive base over the whole surface of the closing bridge 18.

The conductors 14 are produced in the manner indicated with reference to the conductors 13. However, as already stated, after photogravure which leaves the conductors 14, the insulating layers 16, 17 and 19 present are selectively dissolved in the surfaces such as *e f g h*. It is only after this that the continuous fourth insulating layer 21 is deposited. In order to form the second closing bridges 22, a continuous layer of a conductive metal such as copper or nickel may first be chemically deposited This layer is thereafter electrolytically thickened by a deposition of isotropic Ni-Fe to the desired thickness. After deposition of a further layer (not shown) of photo-resist, the latter is exposed through a plate defining the contours of the second closing bridges. After dissolution of the exposed portions, or of the non-exposed portions, depending upon the nature of the photo-resist layer, it merely remains to etch the metallic layers selectively in order to obtain the second closing bridges 22.

Since residual air gaps have been allowed to remain in this memory element, the latter may optionally be produced in a semi-integrated form. In this case, all the necessary component parts, with the exception of the conductors 14, the insulating layer 21 and the closing bridges 22, are produced by the aforesaid methods of deposition.

The conductors 14 are deposited in the form of printed circuits upon a sheet of flexible plastics such as polytetrafluoroethylene, or another of the "Mylar" type. Since this sheet is very thin, for example not exceeding 50 microns, the printed circuit sheet is flexible and may adapt itself to all the variations in level exhibited by the integrated components when it is applied to the latter. In place of the closing bridges 22, there is applied over the whole assembly obtained a magnetic element, called a "keeper" in English. The latter is composed essentially of a thin sheet of flexible plastics which contains a powdered ferrite filler, the means magnetic permeability being relatively low. In another method, a continuous thin sheet of ferromagnetic material may be applied to the sheet of plastics, while preserving sufficient flexibility.

In all cases, the memory element thus obtained may give satisfactory results, although one of the magnetic circuits is not completely closed.

FIGS. 2B, 2C and 2D illustrate sections taken along the lines X—X, Z—Z and Y—Y respectively of FIG. 2A. The memory element illustrated in these figures is constructed around the anisotropic film 23. The first closing bridge 18 is situated vertically above the word conductor 13 and has its ends in contact with the upper face of the film 23, since the insulating layers 16 and 17 are interrupted in the zones such as *a b c d*. Two pole pieces 24 extend over the width of the film 23, below the conductor 13. The digit conductor 14 is insulated between the third and fourth insulating layers 19 and 21.

In this memory element, the problem of the passage of the word conductor 13 has been solved by dividing the second closing bridge into two strips 25 situated on either side of the conductor 13. Since the four insulating layers are interrupted in four zones such as *e f g h*, each of these strips 25 has its ends in contact with the corresponding zones of the pole pieces 24. Thus, in the same way as the first magnetic circuit affecting the conductor 13, the second magnetic circuit, affecting the conductor 14, comprises no residual air gap. In order to reduce the parasitic coupling of the two magnetic circuits through the film 23, the latter may be formed with four recesses 26, which may be seen in FIG. 2A. However, these recesses need not be essential.

The methods by which this memory element is produced may be similar to those described with reference to the memory element of FIGS. 1–1D, but only as far as the operations for producing the digit conductors 14. Thereafter, the operations are somewhat different, in that, after the deposition of the fourth insulating layer 21, the four layers are selectively dissolved so as to bare the pole pieces 24 in the four zones *e f g h*. The contour of the strips 25 is thereafter defined by a thin layer of metal, which may be ferromagnetic, and which is deposited by evaporation in vacuo through an appropriate mask. This deposit is finally thickened by a selective electrolytic deposit of isotropic Ni-Fe.

The memory element illustrated in FIGS. 3 and 3A to 3D is constructed around the anisotropic film 27. FIGS. 3B, 3C and 3D illustrate sections taken along the lines X—X, Z—Z and Y—Y respectively of FIG. 3A. The first closing bridge 28 is situated vertically above the word conductor 13 and has its ends in contact with the upper face of the film 27 (FIG. 3B), since the first and secnd insulating layers 16 and 17 are interrupted in the ones such as *a b c d*. Two pole pieces 29 of isotropic erromagnetic material are applied to the upper face of he film 27 and extend below the conductor 13. The digit onductor 14 is insulated between the third and fourth nsulating layers 19 and 21 respectively. In this memory lement, the problem of the passage of the word conduc- or 13 has been solved by displacing the second closing ridge 30 to a position at one side of and at a distance rom the conductor 13. This element is no longer sym- netrical except about the axis X—X. The ends of the econd closing bridge 30 are in contact with the upper ace of the pole pieces 29, since the four insulating layers re interrupted in two surfaces such as that defined by the oints *e, f, g, h*. In order to reduce the parasitic coupling etween the two closing circuits through the anisotropic ilm 27, the latter may be formed with two recesses 31 aving a length at least equal to the distance A′–B′.

FIGS. 4B and 4D represent sections taken along the ines X—X and Y—Y respectively of FIG. 4A, and FIG. C is a side view seen in the direction of the arrow F. The memory element shown in these figures is con- tructed around the anisotropic film 32, which is cut nto the form of a cross having unequal arms. The latter s associated with the first closing bridge 33 and with he second closing bridge 34, both of which are of rec- angular form. The word conductor 35 is insulated be- ween the first insulating layer 16 and the second in- ulating layer 17. It is divided into two strips **35*a* and 5*b* extending on either side of the closing bridge 34, nd below the closing bridge 33. The transverse conduc- ive connections 35*c*, as illustrated, are optional, since in he case where the strips 35*a* and 35*b* constitute a com- non word conductor, the transverse conductive connec- ions may be shifted to the ends of these strips for the nemory plane under consideration. However, a favour- ble effect is obtained by providing a conductive connec- ion on each side of a memory element. A single con- ection is also sufficient between two neighboring ele- nents. Each magnetic circuit, including the closing bridge 4**, is thus surrounded by a closed conductive loop which ends to maintain equality between the flux passing hrough the section *e f g h* and that passing in the op- osite direction through the same section situated sym- netrically about the axis X—X. The existence of this onductive loop therefore contributes to a reduction of he flux leakages between the bridges 33 and 34 and to he prevention of the creation of a parasitic magnetic ircuit around the conductor 14.

The digit conductor 14 is insulated between the third nd fourth insulating layers 19 and 21. It passes over he first bridge 33 and under the second bridge 34. Since he insulating layers 16, 17 are eliminated in two sur- aces such as *a b c d*, and the four insulating layers are liminated in two surfaces such as *e f g h*, the ends of the wo closing bridges are in contact with the upper face f the anisotropic film 32. While the structure of this ele- nent retains the advantage of symmetry, it has the dis- dvantage of leading to larger dimensions than the con- tructions previously considered.

There exists a further possibility of employing the nemory element of FIG. 4A, and to this end no con- luctive connection **35*c* is provided between the strips 5*a* and 35*b***. Two separate conductors are then present, ne of which may be employed for writing into the nemory and the other for reading. In this case, it is bvious that this memory element is not magnetically ymmetrical about either one of the conductors.

In the following embodiment, the two closing bridges re combined to form a single common closing bridge.

FIGS. 5B and 5C are sections taken along the lines —X and Z—Z respectively of FIG. 5A. In the memory lement illustrated in these figures, the anisotropic film 6 is associated with the closing bridge 37, both being ut into the form of a cross. A first insulating layer 16 is disposed between the film 36 and the word conductor 35, which has the same structure as that of FIGS. 4A to 4D. Therefore, all that has been stated with reference to the latter applies equally here. The digit conductor 38 has an identical structure to the word conductor 35. The distance between the two strips of either one of the conductors is greater than the width of one arm of the cruciform surface of the closing bridge.

The second insulating layer 17 is sufficient to insulate the word conductor from the digit conductor. The third insulating layer 19 which may have the same thickness as the other two, serves to insulate the word conductor 38 from the closing bridge 37.

After the deposition of the third insulating layer, the three insulating layers are eliminated in four surfaces, such as that bounded by the points *a, b, c, d,* so that the four ends of the crossed arms of the closing bridge are in contact with the upper face of the anisotropic film 36.

It may be noted that while in the elements according to FIGS. 1A to 4A the presence of a first closing bridge reduces the capacitive coupling between the word conductor and the digit conductor, this feature is absent in the element according to FIG. 5A. On the other hand, the latter is less costly to produce because the operations of depositing an insulating layer and forming a closing bridge are eliminated.

In addition, while in some of the described embodiments the presence of increased thicknesses of ferromagnetic material, which have been referred to as pole pieces, may be regarded as necessary, it may be chosen to provide such pole pieces also in the zones indicated as having to effect the contact of the ends of one or both closing bridges with the anisotropic film. In the case of FIGS. 1A, 2A and 3A, this addition would not involve any additional operation. It is only in the case of FIGS. 4A and 5A that additional operations would be necessary.

It has been seen that, in the above-described memory elements, the flat elements of anisotropic ferromagnetic film are generally cut out to correspond with the external contours of the closing bridge or bridges under consideration, or in other appropriate forms. However, if certain precautions are taken in the determination of the dimensions, it is not essential for the anisotropic films to be thus cut out and independent of one another. They may be replaced by a continuous layer of Ni-Fe rendered anisotropic, in which each storage cell has its surface bounded by the contours of the closing bridge or bridges. In this way, the photogravure operations applied to the anisotropic films are eliminated.

As compared with the previously indicated processes of manufacture which are intended to produce magnetic circuits having no air gap, it may be observed that it is possible to simplify them considerably in all cases where it is permissible to leave a conductive or insulating air gap in a magnetic closing circuit. Generally speaking, this necessitates the provision of a larger surface for the opposite portions of the magnetic members, and consequently a limitation in the obtainable density.

In the various embodiments described, it is possible to form the closing bridge in the direction of easy magnetisation of a relatively "hard" material from the magnetic viewpoint, i.e. one whose coercive field is substantially higher than that of the main anisotropic layer. This makes it possible to construct a matrix memory which is used only for reading, after the initial writing of the desired information. Such a memory is often referred to as a "fixed memory." For the writing, it is necessary to dispose close to these closing bridges an additional set of writing conductors, which are not shown in the drawings. This set of writing conductors may thereafter be removed or left in the memory plane.

It is also possible to construct all the previously described memory elements in semi-integrated form. In this case, the complete device is composed of two separately produced integrated sub-assemblies. The first sub-assembly comprises the anisotropic films, an appropriately insulated network of conductors, the bridges for closing the flux in one of the two main directions and where necessary increased thicknesses of magnetic material in the other direction.

The second sub-assembly comprises the second network of conductors and the corresponding closing bridges. The latter may consist of a continuous sheet of magnetic material or of separate elements produced in the same way as those of the first sub-assembly. These two sub-assemblies are disposed face to face, all necessary precautions being taken to ensure correct positioning of the two parts of each magnetic element one above the other.

From the viewpoint of the use of a memory plane incorporating a plurality of elements according to the invention, it is to be noted that the functions of the word conductors and of the digit conductors may be interchanged, provided that the direction of the axis of easy magnetisation of the anisotropic films is turned through 90°.

Although the essential features of the invention have been described in the foregoing and illustrated in the drawings, it is obvious that the person skilled in the art may make therein any modifications of forms and detail which are considered necessary, without departing from the scope of the invention.

What is claimed is:

1. In a magnetic matrix store wherein a storage cell is located at each crossing point of two conductors pertaining to a first set and a second set of orthogonal electric conductors, a data storage element of the type comprising a thin film of magnetic material having uniaxial anisotropy, located close to a portion of one flat conductor of said first set of conductors and wherein a storage cell is delimited on said film by two closing bridges made of the same magnetic but isotropic material, locating means being provided for positioning and insulating from each other the conductive and magnetic members, a first one of said closing bridges being of rectangular outline with its two end portions engaging one face of said film to surround the conductor of said first set, the storage element being characterised in that the second of said closing bridges, also of rectangular outline, has a length greater than the width of said first closing bridge and is arranged to lie over the conductor of said second set, partially to lie over said first closing bridge and has two end portions lying over said face of said anisotropic film.

2. A storage element as claimed in claim 1, wherein the conductor of said first set is composed of two conducting strips spaced apart from the width of said second closing bridge.

3. A storage element as claimed in claim 1, wherein a transverse conductive strip is provided between the two strips of said conductor, on each side of said second closing bridge.

4. A storage element as claimed in claim 1, which includes two pole pieces of magnetic material, each being applied to an end portion of said film and thus passing between the latter and the conductor of said first set of conductors.

5. A storage element as claimed in claim 4, characterised in that the locating means comprises insulating layers, all but one of which layers are interrupted between the end portions of said second closing bridge and said magnetic pole pieces on said film.

6. A storage element as claimed in claim 4, wherein said second closing bridge is divided into two parallel strips spaced apart from the width of the conductor of said first set of conductors.

7. In a magnetic matrix store wherein a storage cell is located at each crossing point of two conductors pertaining to a first set and a second set of orthogonal electric conductors, a data storage element of the type comprising a thin film of magnetic material having uniaxial anisotropy, located close to a portion of one flat conductor of said first set of conductors, which is parallel to one of its main magnetisation axes, and a closing bridge member adapted to surround a pair of said conductors at their crossing point, the storage element being characterised in that said closing bridge member is formed with two crossing branches of determined width, and in that each of the conductors of said sets is composed of two parallel strips spaced apart from the width of one branch of said closing bridge member and which pass between the other branch of said bridge member and one face of said film.

8. A storage element as claimed in claim 7, wherein a transverse conductive strip is provided between the two strips of at least one of said conductors, on each side of a branch of said closing bridge member.

References Cited

UNITED STATES PATENTS 3,259,888 5/1966 Cornley et al. ------- 340—174

BERNARD KONICK, Primary Examiner

S. B. POKOTILOW, Assistant Examiner

U.S. Cl. X.R.

29—604